ANNUNCIATOR SYSTEMS

Filed March 16, 1961

INVENTOR.
GEORGE E. FOSTER
BY Silverman, Mullin and Cass
Att'ys.

United States Patent Office 3,124,793
Patented Mar. 10, 1964

3,124,793
ANNUNCIATOR SYSTEMS

George E. Foster, 7917 S. Yale Ave., Chicago, Ill.
Filed Mar. 16, 1961, Ser. No. 96,253
20 Claims. (Cl. 340—213.2)

This invention relates in general to annunciator systems, and more particularly, to annunciator systems utilizing a bistable single gate element as a memory.

The developments in annunciator systems in recent years have swung heavily in favor of utilizing electronic or static type devices in preference to conventional relay or electro-mechanical type arrangements previously in vogue. These devices have a number of advantages over relays in that no problem of frozen or inoperative contacts need be feared at the time the annunciator is required to operate. On the other hand, electronic devices require quite expensive circuitry in order to provide required functions and in addition, the circuits utilizing electronic components cannot easily be adapted to provide different types of annunciator functions.

It is therefore an object of the present invention to provide an improved economical annunciator system utilizing electronic devices. This objective is made possible by the utilization of a silicon controlled rectifier hereinafter generally referred to as an SCR. This rectifier may be considered as similar in nature to a thyratron in that it is bistable, being rendered conductive responsive to a particular potential applied to a control electrode, whereafter it either remains conductive irrespective of the control electrode potential or may be rendered nonconductive by opening the main conductive path. It then remains non-conductive irrespective of the later closure of the main path, unless the proper potential is again applied to the control electrode. Its characteristics are more fully described in a publication entitled "Control Rectifier Manual," published by General Electric Company, copyright 1960.

With the described rectifier the number of expensive circuit components needed to perform various annunciator functions is considerably reduced. Thus a single rectifier of the type described may be controlled responsive to various annunciator conditions such as an original signal change at a monitored location and subsequent acknowledgement operations to provide indications indicative of the various conditions of the system. In addition, it considearbly simplifies the test apparatus necessary to determine that the system is operating satisfactorily. This is because test voltages of comparatively low power can be used to trigger the various annunciator functions and these voltages can be applied through equipment used for other purposes so that various components can perform dual functions.

It is still another object of this invention therefore to provide an annunciator system utilizing a single bistable gate element such as the described rectifier to retain an indication of a signal change at a monitored location irrespective of whether the signal change is momentary or of long duration. This object is accomplished by arranging the gate or rectifier to conduct in response to the signal change and since the rectifier conducts thereafter irrespective of the reversion of the signal, an indication provided under control of the rectifier is retained.

It is still another object of this invention to provide an annunciator system utilizing a single bistable gate element such as the described rectifier for controlling a number of annunciator functions including such functions as under one circumstance retaining an indication of a signal despite the disappearance of the signal and under another circumstance providing an indication that the signal has disappeared.

It is another object of this invention to utilize a single common bistable gate element such as the described rectifier connected over a common path to a number of separate circuits in an annunciator system to control common signal apparatus to provide an alerting signal, for example, responsive to a signal change occurring at any of the separate circuits.

It is yet another object of this invention to provide a basic annunciator circuit design which is capable of certain annunciator functions and which may be easily modified to provide other functions.

The arrangements for accomplishing the foregoing and other objects of the present invention will become apparent on examination of the following specification, claims and drawings, wherein:

Figures 1, 2, 3:
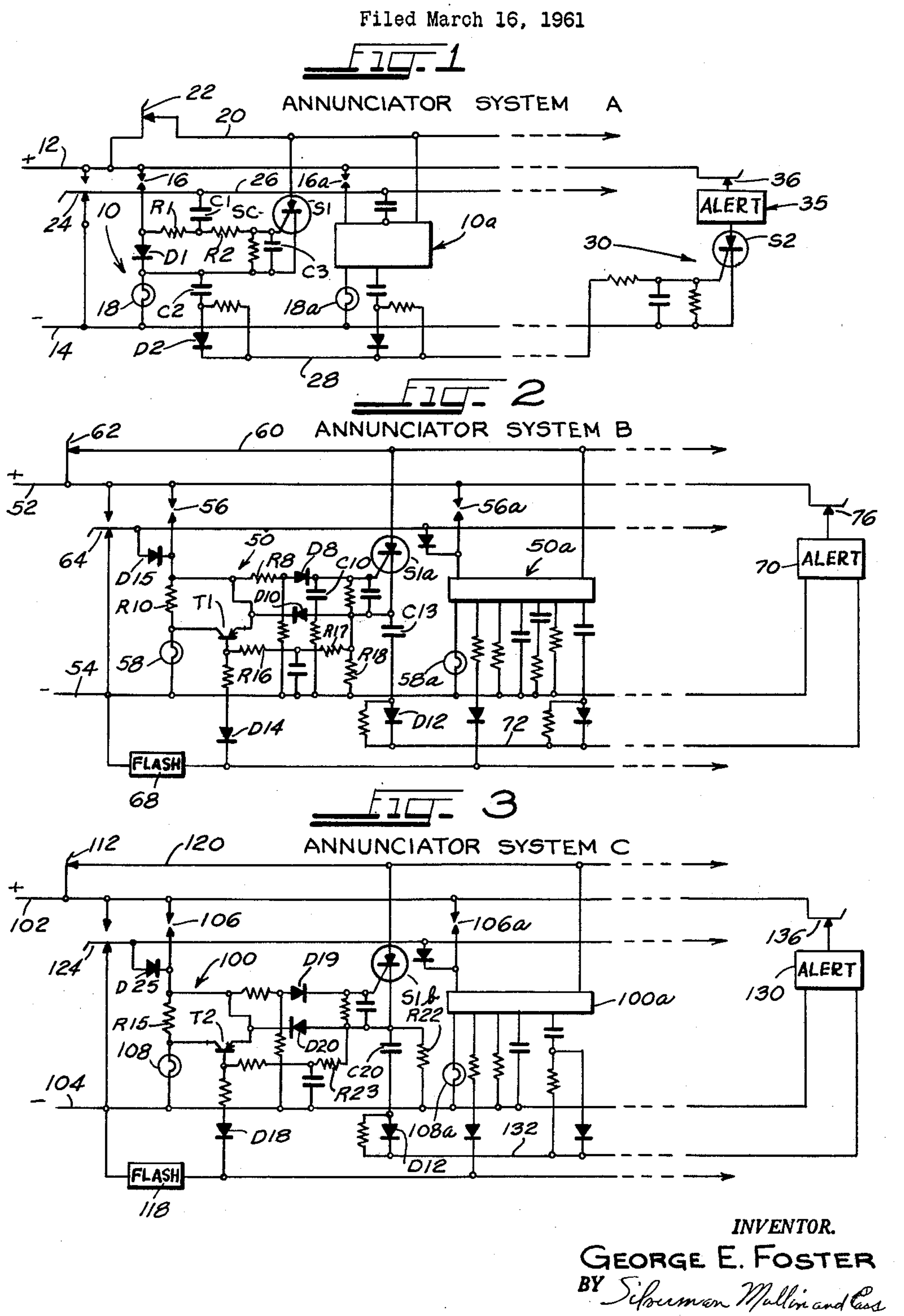
FIG. 1 illustrates a basic annunciator system utilizing a silicon controlled rectifier.
FIG. 2 illustrates the manner in which the circuit of FIG. 1 can be altered to provide additional annunciation functions.
FIG. 3 illustrates how the circuit of FIG. 2 can be altered to permit other annunciator functions.

FIG. 1 illustrates the Annunciator System A which is designed to provide the function of informing an attendant of the location at which a signal originates irrespective of the disappearance of the signal. System A comprises a pair of leads 12 and 14 which transmit positive and negative potentials respectively to the various parts of annunciator systems. The system may be used in many different manners as, for example, monitoring apparatus in a plant for a trouble condition; transmitting information as to when certain functions are completed at the monitored apparatus or simply for calling; however, in the following specification the respective systems will be described in conjunction with the monitoring of apparatus to indicate a trouble condition although the systems are not limited to such use. Thus the lead 12 extends a positive potential to respective locations at which apparatus to be monitored is placed. The monitoring is done by respective normally open trouble contacts such as 16 and 16*a*, etc. provided at the respective locations and arranged to be closed in any well known manner responsive to a trouble condition originating at the monitored apparatus.

Each trouble contact is connected to a respective supervisory circuit such as 10 and 10*a* through a respective diode such as D1. Each supervisory circuit has associated therewith a respective lamp 18 or 18*a*. These lamps are operated to indicate a trouble condition at the respective monitored apparatus responsive to the closure of the respective trouble contacts as will be explained.

Each supervisory circuit such as 10 comprises a single bistable gate element being the silicon controlled rectifier or SCR previously described and indicated at S1. The rectifier S1 comprises an anode which is connected to the positive potential on lead 12 through the common acknowledgment bus 20 and the lamp acknowledgment key 22. The cathode of S1 is connected between the diode D1 and lamp 18 which in turn is connected to the negative potential on lead 14. The control electrode SC of rectifier S1 is connected through a resistance network R1 and R2 to the lead connected between normally open contact 16 at the monitored apparatus and diode D1.

The control electrode SC is provided with suitable bypass capacitors C1 and C2 which serve to by-pass transient signals from the control electrode SC to the lead 14. Capacitor C1 is connected by means of the common test lead 26 to lead 14 through the contacts of the test key 24.

Each supervisory circuit 10 and 10*a* is also connected through a capacitor and diode such as C2 and D2 respectively to a common signal transmission path 28. A high value resistance R5 is connected in shunt with diode D2.

The path 28 is connected to a gate circuit 30 which comprises a bistable gate element S2 similar to the SCR designated S1. The element S2 has its control electrode connected to the lead 28 through a suitable resistance and is also provided with a by-pass capacitor. The element S2 is arranged to operate certain alterting apparatus indicated at block 35, when element S2 is rendered conductive responsive to a proper signal on lead 28.

The alerting apparatus at block 35 may comprise either a sound circuit which provides a tone for alerting an attendant of may comprise any other apparatus for performing a desired indicating or other function responsive to the rectifier S2 being rendered conductive all in any well known manner. An acknowledgment key 36 is provided for terminating operation of the apparatus at 35 and is also arranged in any well known manner to render S2 simultaneously non-conductive.

With contacts 16 and 16*a*, etc. in their open condition, no signal is extended to the respective supervisory circuits 10 and 10*a* and the lamps 18 and 18*a* etc, together with the alerting apparatus 35 are in their quiescent or unoperated condition. This indicates that the apparatus at the respective locations is functioning normally.

In the event a trouble condition should arise at the apparatus monitored by contacts 16, for example, those contacts close. This causes the transmission of a positive pulse through the resistors R1 and R2 to the control electrode SC of the SCR S1. The SCR now passes current from lead 12, through the contact of acknowledgment key 22, lead 20, the anode and cathode circuit of the SCR, and the lamp 18 to the lead 14. A circuit for the lamp 18 is also completed directly from the lead 12, the trouble contacts 16 and the diode D1 to lead 14. The lamp 18 therefore lights and being individual to the contacts 16 serves to identify the respective apparatus or location at which the trouble arose.

Simultaneously with the completion of a circuit to the lamp 18, a positive pulse is extended through the capacitor C2 and the diode D2 to the common gate 30. This pulse is extended to the control electrode of the SCR S2, which fires to initiate operation of the common alerting apparatus 35. The attendant is therefore alerted to the trouble condition and scans the lamps to identify the location at which it arose. This initial signalling condition with the apparatus 35 and lamp 18 operated is known as the alert condition.

If the trouble condition is momentary, the contacts 16 may open before the acknowledgment key 22 is operated, and therefore the direct circuit to the lamp 18 through diode D1 is also opened. The lamp 18 remains operated or lighted, however, as the circuit completed through key 22, lead 20 and the SCR S1 remains effective. The attendant therefore can identify the location at which the trouble condition originated irrespective of the reversion of the contacts 16 to normal. This permits a more facile investigation of any possible trouble situation.

The attendant may extinguish the signal provided by the common alert apparatus 35 by simply operating the acknowledgment key 36 to open the anode cathode path of S2, and since no further positive pulses are transmitted to the gate circuit 30, unless another trouble situation arises, the alerting apparatus 35 will remain off.

To extinguish the lamp at any supervisory circuit, the acknowledgment key 22 is operated to open the anode cathode circuit of S1, for example, after the trouble condition has been removed. Thus if the trouble condition was removed before acknowledgment, the contacts 16 are open and therefore one circuit to the lamp 18 is open. Operation of key 22 opens the other circuit to the lamp 18 extending through S1 and since contacts 16 are open, S1 cannot refire when key 22 is restored. The lamp 18 therefore remains off.

If the trouble condition had not been restored prior to acknowledgment, the operation of the acknowledgment key momentarily opens the circuit for S1. The circuit for the lamp 18 remains completed at contact 16. As soon as the key 22 is released the anode cathode circuit to S1 is reestablished and S1 refires as its control electrode has a positive bias extended thereto. A second positive pulse, however, is not transmitted through the the capacitor C2 as this capacitor remains in its equilibrium condition with contacts 16 remaining closed. Thus it is only after the trouble condition has been cleared, that the operation of the acknowledgment key 22 serves to extinguish the lamp 18. Key 22 may if desired also assume the function of key 36 in any well known manner so that only one acknowledgment key need be provided in the system.

At this point it will be noted that capacitor C1 serves a dual function of aiding in by-passing transients and also triggering S1 during a test operation. Thus operation of test key 24 from the position shown in FIG. 1 connects capacitor C1 to the common source of positive voltage at lead 12. The capacitor transmits a positive pulse to the control electrode SC of S1 and the annunciator system now simulates an actual trouble situation. Suitable tests may now be performed and key 24 returned to its normal condition.

FIG. 2 illustrates the Annunciator System B which is designed to provide a signal indicating when the trouble condition is cleared, after acknowledgment. This type of system is known as a ringback system. The positive and negative power supply leads are therein identified as 52 and 54 respectively. The respective trouble contacts are indicated at 56 and 56*a* and connect to respective supervisory circuits 50 and 50*a*. The supervisory circuits have a respective lamp 58 and 58*a*; however, each of the lamps are now connected to the respective contacts such as 56 through a resistor such as R10 that is in shunt with the emitter collector circuit of normally off transistor T1.

The control electrode of the SCR S1*a* is connected to the trouble contacts 56 through the diode D8 and a resistor R8. The anode-cathode circuit of S1*a* is connected in shunt with the trouble contacts through the common lamp acknowledgment lead 60 and the key 62. The cathode of S1*a* is connected to the emitter circuit of T1 and to resistor R10 through diode D10.

In addition to the common test key indicated at 64 and connected through a respective diode such as D15 to each supervisory circuit, a common flasher circuit indicated by box 68 is provided. The flasher circuit 68 is of any well known type adapted to supply intermittent negative pulses through each diode such as D14 to the base circuit of a respective transistor such as T1. The resistors R16, R17 and R18 connected between the base circuit of T1 and lead 54 with the junction between R17 and R18 connected to the cathode of S1*a* form an OR gate whose function will be subsequently explained.

The common sound or alerting circuit including a gate circuit such as 30 is indicated at 70 and is provided with an acknowledgment key 76.

In the event a trouble condition should arise at the apparatus monitored by contacts 56, those contacts close. This causes the transmission of a positive pulse through the diode D8 to the control electrode of the SCR S1*a*. A circuit is also completed through resistor R19 for lamp 58 and simultaneously the emitter circuit of T1 is biased positive. Each time a negative pulse is applied from flasher 68 to the base circuit of T1, transistor T1 will now conduct. Since the emitter collector circuit of R1 shunts resistor R10, the circuit for lamp 58 alternates between a high and low resistance values so that the lamp 58 lights alternately brightly and dimly to identify the source of the initial trouble during the alert condition.

The SCR S1*a* responds to the positive pulse at its control electrode by drawing current from lead 52 through the acknowledgment key 62, lead 60, through the anode cathode circuit of S1*a* and resistor R18 in shunt with the emitter collector circuit of T1 and lamp 58. A pulse is also transmitted through capacitor C13, diode D12 and lead 72 to operate the common alerting apparatus 70 as explained for gate 30 and sound circuit 35 to alert the attendant.

If the trouble contacts should now open, the direct circuit to the lamp 58 is disconnected at contacts 56. The lamp remains alternately dimly and brightly lighted, however, through the circuit extended from key 62, lead 60, the SCR S1*a*, the diode D10 and resistor R10 in shunt with T1 on each negative pulse applied to the base of T1.

The attendant may extinguish the signal provided by the common alert apparatus 70 by simply operating the acknowledgment key 76. Since no further positive pulses are transmitted thereto unless another trouble situation arises, the alerting apparatus will remain off until it is again operated in order to ringback or signal a reversion of the abnormal condition as will be explained.

After the attendant has been alerted, he operates the acknowledgment key 62 to open the circuit to S1*a*. If the trouble condition was momentary and contacts 56 are open, lamp 58 will extinguish and since subsequent release of key 62 will not reoperate S1*a* the lamp remains off.

If the trouble condition had not been restored prior to acknowledgment, the operation of the acknowledgment key 62 momentarily opens the circuit for S1*a*. The lamp remains operated through contacts 56, however, despite the fact that S1*a* does not reoperate on release of key 62. It does not reoperate because capacitor C10 reaches an equilibrium condition at which the potential of the control electrode of S1*a* is maintained unaltered with respect to the cathode despite reclosure of the key 62. Nor is a second positive pulse transmitted through the capacitor C13 as the potential on this capacitor is maintained substantially unaltered.

During the period that key 62 is open, transistor T1 conducts continuously if contacts 56 are closed. Thus with S1*a* off, the base circuit of T1 swings toward the potential of lead 54 transmitted through resistors R18, R17 and R16. Since the base circuit thereafter draws current continuously, the junction of resistors R17 and R18 swings in a positive direction and permits both the capacitor C10 and the cathode of S1*a* to swing positive in substantially similar amounts. The SCR S1*a* therefore does not fire and capacitor C10 holds this charge on reclosure of key 62. The emitter collector circuit of T1 therefore continuously conducts to shunt resistor R10 and maintains lamp 58 brightly lighted continuously on the reclosure of key 62. This is known as the acknowledged or acknowledgment condition.

Thereafter the contacts 56 may revert to normal or open to provide a ringback signal. The operating potential provided thereby for transistor T1 is therefore removed and its base circuit no longer draws current. The junction of resistors R17 and R18 swing towards the potential of lead 54 so that the cathode of S1*a* is now negative with respect to the control electrode and S1*a* conducts. With S1*a* fired a positive potential is applied through the diode D10 to the emitter circuit of T1 and also to the junction of resistors R17 and R18. The latter places the transistor under control of the negative pulses from the flasher 68 and it conducts responsive to each negative pulse from the flasher. The lamp 58 is therefore alternately energized through resistor R10 and the emitter collector circuit of T1 respectively in series with S1*a*. Thus the lamp 58 lights alternately brightly and dimly as in the alert condition. Simultaneously the firing of S1*a* causes a positive pulse to be transmitted through the lead 72 from the capacitor C13 and diode D12 for operating the common alert apparatus 70. Thus a ringback signal is provided indicating the reversion of the trouble and condition to normal. The annunciator is now in what is known as the flash condition.

The operator again operates the acknowledgment keys 62 and 76 to terminate operation of S1*a* and the alerting apparatus 70 respectively. With contacts 56 open and S1*a* non-conductive, lamp 58 goes off. It will be noted that the lamp 58 remains off on reclosure of key 62 as the operating potential for both it and T1 has been removed at contacts 56 and since capacitor C10 is no longer charged positive relative to the cathode, S1*a* cannot become again conductive. The annunciator system is now in its original condition.

In order to test the annunciator system, key 64 is operated to connect the positive potential on lead 52 thorugh the diode D15 for lighting the lamp 58 and firing S1*a*. The annunciator system may now be tested for various conditions and the key 64 returned to normal.

FIG. 3 illustrates Annunciator System C, which provides automatic reset responsive to the removal of the trouble condition, after acknowledgement. The positive and negative power supply leads are identified as 102 and 104 respectively. The respective trouble contacts are indicated at 106 and 106*a* and connect to respective supervisory circuits 100 and 100*a*. The supervisory circuits have a respective lamp 108 and 108*a* which are connected to the respective trouble contacts such as 106 in the same manner as illustrated for the lamp 58 in FIG. 2.

In fact each supervisory circuit such as 100 and 100*a* comprises a similar circuit arrangement to that illustrated for supervisory circuit 50 with the exception that capacitor such as C10 and the resistor connecting it to the negative lead are omitted. A flasher circuit 118 is provided that functions in a manner similar to circuit 68 to apply alternate negative pulses through the diodes such as D18 to the respective transistors such as T2. The common alerting apparatus is indicated at 130 together with an acknowledgment key 136 therefor. The alerting apparatus 130 is connected to the respective supervisory circuits by way of the common lead 132 and the respective diodes such as D12.

In the event a trouble condition should arise at the apparatus monitored by contacts 106, those contacts close. This causes the transmission of a positive pulse through the diode D19 to the control electrode of the respective SCR S1*b*. A circuit is also completed through resistor R15 for lamp 108 and simultaneously the emitter circuit of T2 is biased positive. Each time a negative pulse is applied from flasher 118 to the base circuit of T2, transistor T2 will conduct. Since its emitter collector circuits shunts resistor R15, the circuit for lamp 108 alternates between a high and low resistance value so that the lamp 108 lights alternately brightly and dimly to identify the source of the initial trouble during the alert condition in the same manner as described for supervisory circuit 50 and lamp 58.

The SCR S1*b* responds to the positive pulse at its control electrode by drawing current from lead 102 through the acknowledgment key 112, lead 120, through the anode cathode circuit of S1*b* and resistor R22 extending to the lead 104 as explained for S1*a*. A pulse is also transmitted through capacitor C20, diode D15 and lead 132 to operate the common alerting apparatus or sounder 130 as explained or apparatus 70.

If the trouble contacts should now open, the direct circuit to the lamp 108 is disconnected at contacts 106. The lamp remains alternately dimly and brightly lighted, however, through the circuit extended from key 112, lead 120, the SCR S1*b*, the diode D20 and resistor R15 in shunt with T2 on each negative pulse applied to the base of T2 as explained for a similar condition at supervisory circuit 50. This of course provides a record of even a momentary fault condition so that its source may be more easily traced.

The attendant may extinguish the signal provided by the common alert apparatus 130 by simply operating the acknowledgment key 136, and since no further positive pulses are transmitted thereto unless another trouble situation arises, the alerting apparatus will remain off.

After the attendant has been alerted, he operates the acknowledgment key 112 to open the circuit to S1*b*. If the trouble condition was momentary and contacts 106 are open, lamp 108 will extinguish and since subsequent release of key 112 will not reoperate S1*b* the lamp remains off.

If the trouble condition had not been restored prior to acknowledgment, the operation of the acknowledgment key 112 momentarily opens the circuit for S1*b*. The lamp remains operated through contacts 106, however, despite the fact that S1*b* does not reoperate on release of key 122 as will be explained. A second positive pulse is not transmitted through the capacitor C20 as the charge on this capacitor does not alter significantly during the time key 112 is open.

During the period that key 112 is open transistor T2 conducts continuously as its base circuit first swings toward the potential of lead 104 transmitted through resistors R22 and R23. Since the base circuit thereafter draws current continuously, the junction of resistors R22 and R23 swings in a positive direction and since the cathode of S1*b* is at value that is substantially as positive as the control electrode, the SCR S1*b* does not fire.

Reclosure of key 112 does not alter this situation and therefore S1*b* remains nonconductive. The emitter collector circuit of T2 therefore continuously conducts to shunt resistor R15 and maintain lamp 108 brightly lighted continuously. This is known as the acknowledged annunciator condition.

Thereafter the contacts 106 may revert to normal and open. The operating potential for transistor $T^2$ is therefore removed and its base circuit no longer draws current. Since the control electrode of S1*b* does not swing positive with respect to the cathode, S1*b* does not conduct and the lamp 108 extinguishes as no circuit thereto is completed. Thus the annunciator has been automatically reset to its initial condition.

Test key 124 is operated to connect the positive potential on lead 102 through the diode D25 for firing S1*b*. The annunciator system may then be tested for various conditions and the key 124 returned to normal as explained for the other systems.

The invention has been described with respect to certain annunciator systems but since it is believed to be broader than the disclosed embodiments, the invention is believed more adequately set forth in the appended claims.

I claim:

1. An annunciator system for monitoring respective remote locations each having a circuit over which a respective signal is transmitted responsive to a change in the condition at the respective location, the improvement comprising a bistable element connected in shunt with a respective one of each of the circuits and whose stable state is reversed responsive to a signal transmitted over the respective circuit means for applying signals transmitted over said circuits in controlling relation to a respectively associated bistable element thereby to shift said last named element to a reversed, conducting condition, and an indicator connected in series with a respective one of each of the bistable elements and with the respective transmitting circuit and operated either by the signal or by the respective bistable element in the reversed state whereby said indicator is energized by way of both said circuit and said element upon application of a signal to said circuit and remains operative irrespective of the disappearance of said signal.

2. In the system claimed in claim 1, momentarily operable acknowledgment means for returning said bistable element to normal, means for thereafter retaining said element in its normal condition despite the presence of said signal.

3. The system claimed in claim 2 in which said indicator is thereafter automatically rendered inoperative responsive to the disappearance of said signal.

4. The system claim in claim 2 in which the condition of said element is thereafter again reversed responsive to the disappearance of said signal, and said indicator is operated solely by element.

5. In the system claimed in claim 1, a resistor connected in shunt with a low resistance electronic switch and connected between each indicator and the respective transmitting circuit and bistable element.

6. In the system claimed in claim 5, means controlled by said bistable element in reversed state for enabling said switch to conduct intermittently.

7. In the system claimed in claim 5, acknowledgment means for placing said element in its original condition, and means controlled responsive to said element being in its original condition for enabling said switch to conduct continuously.

8. In the system claimed in claim 1, a single common bistable element connected over a common transmission path to each other element, and a common indicator operated by said common element responsive to the reversion of the stable state of any one of said other elements.

9. An annunciator system for monitoring respective remote locations at which a signal is derived responsive to a change in the condition at the respective location, the improvement comprising a silicon controlled rectifier for each location, each rectifier having an anode cathode circuit and a control electrode, each rectifier having its anode cathode circuit rendered conductive responsive to a predetermined potential applied to the respective control electrode and thereafter remaining conductive irrespective of the disappearance of said potential, means for connecting the signal at a respective location to the control electrode of the respective rectifier for initiating conduction through said anode cathode circuit, an indicator connected in series with the conductive anode cathode circuit and held operative by said conductive anode cathode circuit for identifying the location at which the signal is derived, and a resistor having the emitter collector circuit of a transistor in shunt therewith and connected between each indicator and the anode cathode circuit of the respective rectifier.

10. An annunciator system for monitoring respective remote locations each having a circuit over which a respective signal is transmitted responsive to a change in the condition at the respective location, the improvement comprising an element which is stable in either its conductive or nonconductive condition connected in shunt with a respective one of each of the circuits and which is rendered conductive responsive to a signal transmitted over the respective circuit means for applying signals transmitted over said circuit in controlling relation to said element, an indicator connected in series with a respective one of each of the bistable elements and with the respective transmitting circuit and arranged to complete a conductive path for the respective bistable element whereby said indicator is held operative either by the signal or by the respective bistable element in its conductive state, and acknowledgment means connected in common with each element for momentarily opening the shunt connection of each element.

11. In the system claimed in claim 10, a test circuit connected in shunt with acknowledgment means to each of said elements for rendering said elements conductive.

12. An annunciator system for monitoring respective remote locations at which a respective circuit is operable for transmitting a signal responsive to a change in the condition at the respective location, the improvement comprising a silicon controlled rectifier for each location having a control electrode connected to the respective circuit whereby said rectifier is rendered conductive responsive to a transmitted signal and remains conductive irrespective of the disappearance of said signal, an indicator for each location connected in common to the respective circuit and to the rectifier, said indicator being rendered operative and held operative responsive either to said transmitted signal or to the conducton of the respective rectifier, and acknowledgment means for momentarily preventing conduction through each rectifier whereby a previously conducting rectifier is enabled to respond to either the presence or absence of a signal at a respective circuit for permitting the respective indicator to indicate the corresponding signal condition.

13. An annunciator system for monitoring respective remote locations at which a respective circuit is controlled for transmitting a signal responsive to a change in the condition at the respective location, the improvement comprising a silicon controlled rectifier for each location, each rectifier having a cathode anode circuit and a control electrode, each rectifier having its anode cathode circuit rendered conductive responsive to a predetermined potential applied to the respective control electrode and thereafter remaining conductive irrespective of the disappearance of said potential, means for connecting the signal at a respective location to the control electrode of the respective rectifier to initiate conduction through said anode cathode circuit, an indicator for each location connected in series both with the respective signal transmitting circuit and separately with the anode cathode circuit and rendered operative and held operated in one manner responsive either to said transmitted signal or the respective conductive rectifier anode cathode circuit, acknowledgement means connecting said anode cathode circuit in shunt with said respective signal transmitting circuit, means operable to hold said anode cathode circuit nonconductive after the momentary operation of said acknowledgement means and rendering said anode cathode circuit conductive to operate said indicator in said one manner if said signal disappears after operation of said acknowledgement means, and means for operating said indicator in another manner after operation of said acknowledgment means and before disappearance of said signal.

14. The system claimed in claim 13 in which said means for operating said indicator in said other manner comprises an intermittently operated transistor.

15. The system claimed in claim 13 in which said means for holding said anode cathode circuit non-conductive comprises means for biasing said cathode in a predetermined manner with respect to said control electrode responsive to the operation of said acknowldegement means and for removing said bias responsive to the disappearance of said signal.

16. The system claimed in claim 13 in which said means for rendering said anode cathode circuit conductive if said signal disappears comprises an electrical storage element whose removal permits said indicator to be rendered inoperative responsive to the disappearance of said signal.

17. An annunciator system for monitoring respective remote locations at which a respective circuit is operable for transmitting a signal responsive to a change in the condition at the respective location, the improvemen comprising a respective bistable element connected to each circuit whereby each bistable element has its state reversed responsive to a respective transmitted signal and remains in said reversed state irrespective of the disappearance of the respective signal, an indicator connected in series with each circuit and in series with the respective bistable element whereby said indicator is renedred operative and held operative either by said transmitted signal or the respective bistable element in said reversed state, acknowledgment means for returning any bistable element from its reversed state to its original state, and means controlled responsive to the return of any element to its original state for thereafter retaining said element in said original state despite the presence of said signal and for causing said element to again reverse its state responsive to the disappearance of said signal.

18. In the system claimed in claim 17, means for operating said indicator in one manner responsive to the said bistable element being in its reversed state responsive to said transmitted signal.

19. The system claimed in claim 18 in which said operating means is controlled responsive to the return of said element to its original state for operating said indicator in another manner.

20. The system claimed in claim 19 in which said operating means is controlled by said element in response to the disappearance of said signal for operating said indicator in said one manner after its operation in said other manner.

References Cited in the file of this patent

UNITED STATES PATENTS

| | | |
|---|---|---|
| 2,701,872 | Marmorstone | Feb. 8, 1955 |
| 2,719,966 | Schurr | Oct. 4, 1955 |
| 2,730,704 | Warren | Jan. 10, 1956 |
| 3,084,338 | Mauer et al. | Apr. 2, 1963 |